United States Patent
Hoopes

(10) Patent No.: US 6,816,352 B2
(45) Date of Patent: Nov. 9, 2004

(54) ABNORMAL VOLTAGE PROTECTION CIRCUIT

(75) Inventor: Michael L. Hoopes, Novato, CA (US)

(73) Assignee: Panamax, Petaluma, CA (US)

( * ) Notice: Subject to any disclaimer, the term of this patent is extended or adjusted under 35 U.S.C. 154(b) by 120 days.

(21) Appl. No.: 10/077,160

(22) Filed: Feb. 15, 2002

(65) Prior Publication Data

US 2002/0126433 A1 Sep. 12, 2002

Related U.S. Application Data

(60) Provisional application No. 60/268,880, filed on Feb. 16, 2001.

(51) Int. Cl.[7] .................................................. H02H 5/04
(52) U.S. Cl. ........................ 361/104; 361/103; 361/118
(58) Field of Search ................................. 361/103, 104, 361/117, 118

(56) References Cited

U.S. PATENT DOCUMENTS

| 4,907,119 A | * | 3/1990 | Allina .......................... 361/56 |
| 5,381,296 A | * | 1/1995 | Ekelund et al. .............. 361/106 |
| 6,040,971 A | * | 3/2000 | Martenson et al. .......... 361/118 |
| 6,486,570 B1 | * | 11/2002 | Price et al. .................. 307/105 |
| 6,636,409 B2 | * | 10/2003 | Kladar et al. ................ 361/127 |
| 2001/0022716 A1 | * | 9/2001 | Glaser et al. ................ 361/117 |

OTHER PUBLICATIONS

The new UL 1449 standard for transient voltage surge suppressors (3 pages), Dr. Richard L. Cohen (Jul. 1998).*

* cited by examiner

Primary Examiner—Hung V. Ngo

(57) ABSTRACT

A surge protector utilizing MOVs has a capacitor connecting line input to neutral input that causes thermal fuses to sequentially disconnect the line conductor from the output of the protector under limited current abnormal overvoltages either line to ground or neutral to ground.

31 Claims, 5 Drawing Sheets

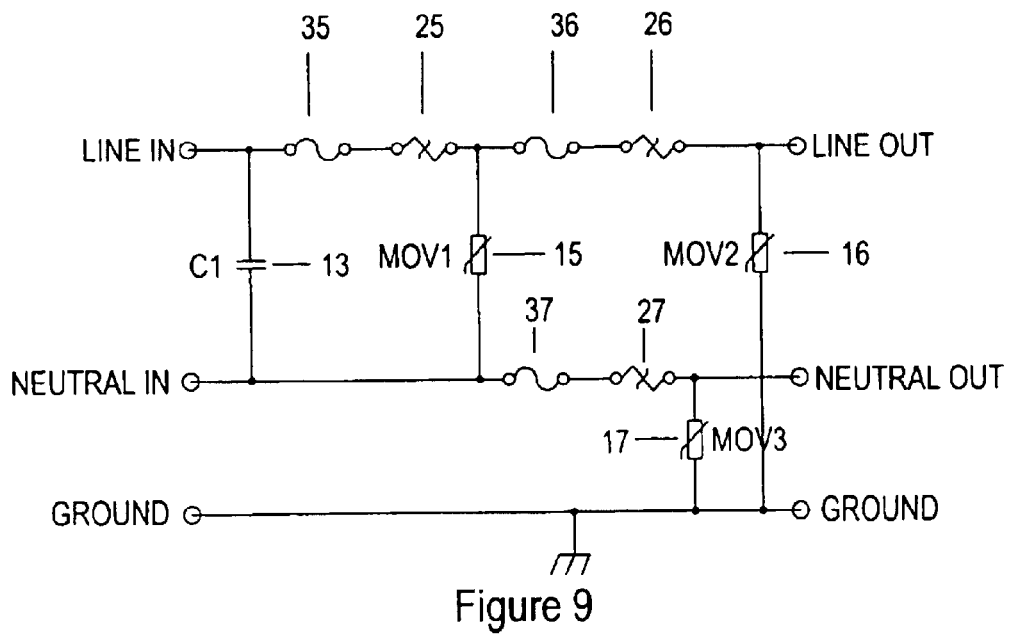
Figure 9
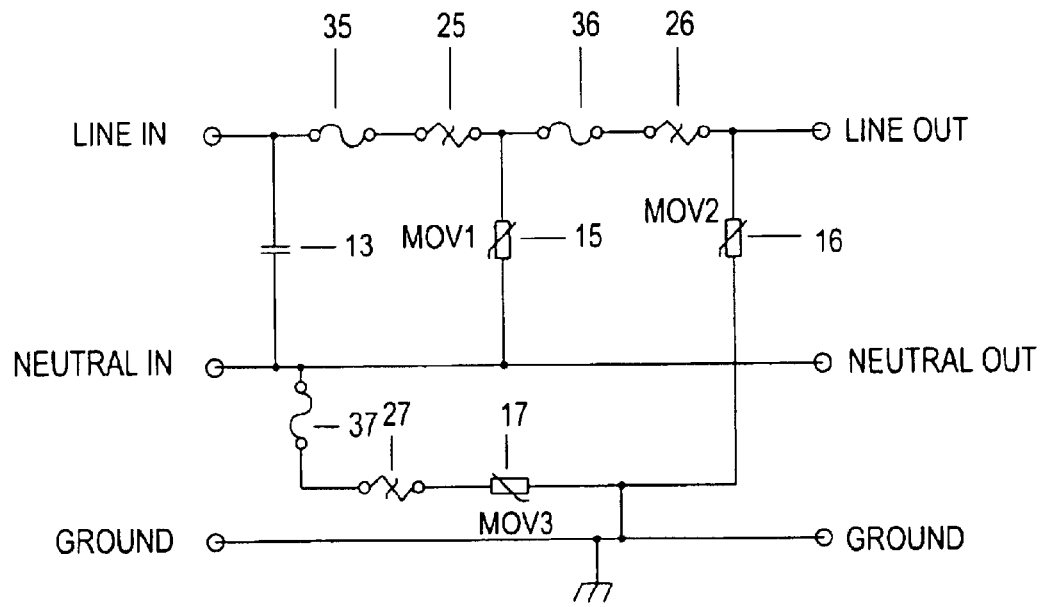
Figure 10
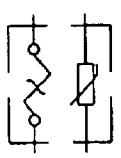 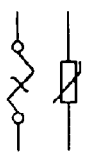
Figure 11A    Figure 11B

ABNORMAL VOLTAGE PROTECTION CIRCUIT

This application claims the benefit of provisional application No. 60/268,880 filed Feb. 16, 2001.

BACKGROUND OF THE INVENTION

The present invention relates to an over voltage protection circuit for interconnection between electric equipment and a source of electrical power, typically alternating current.

DESCRIPTION OF RELATED ART

Transient voltage surge suppressors (TVSS) are often included between the electric power lines and electrical equipment connected to such power line. The purpose of these surge suppressors is to protect the electrical equipment from surges and other transients due to lightning, switching impulses and other complications from the power lines. These suppressors protect by blocking the surges before they reach the electrical equipment connected to the power line. The protectors themselves normally protect for a 6,000 volt, 500 amp, 20 micro-second pulses. These pulses are the largest that were once expected to occur on an interior outlet in a 120 volt AC 15 amp distribution circuit. Surge suppressors built to this withstand level were thought to have protection against lightning strikes and other known transients and surges. A common surge protection method is to include a voltage limiting device between line and neutral. In most protectors, this meant utilizing a metal oxide varistor (MOV) in series with a thermal catastrophic fuse between line and neutral. In this device, if the incoming over voltage is strong enough to damage the voltage limiting device, the fuse opens thereby disconnecting the voltage limiting device from the circuit and preventing its destruction. However, with the disconnection of the voltage limiting device subsequent transients and surges can pass directly to the electrical equipment connected to the device. Recognizing this type of operation, in well designed newer surge protectors the electrical equipment is disconnected from the line in the event of an incident of transients or surges sufficient to cause the protection circuit to overload. Such a device is shown in FIG. 7 herein. This action is said to simultaneously protect the voltage limiting device as well as the electrical equipment interconnected to the power connection. The device, however, may still suffer from leakage. Another characteristic of more recent protection designs is that the housing can remain intact after two 3,000 amp or twenty 500 amp surges, even if the protection devices or fuses have been damaged.

The present invention is to provide additional functions over and above that provided by even the new protectors in a compact, simple structure.

OBJECTS AND SUMMARY OF THE INVENTION

It is an object of this invention to disconnect the line in an overvoltage situation;

It is another object of this invention to provide for a competent multi-state power protection circuit;

It is yet another object of the present invention to increase the levels of protection of a power protection circuit;

It is still another object of the present invention to provide a mode of protection against open neutral conditions in building wiring;

It is a further object of the present invention to protect against high voltage power cross events;

It is yet another object of this invention to provide for the same measure of protection in a line to neutral reversed wiring condition;

It is another object of the present invention to provide for a dual mode power protection circuit;

It is a further object of this invention to provide for a power protection circuit which disengages power from the protected device;

It is yet another object of this invention to reduce ancillary leakage through a damaged surge protector;

Other objects of the invention and a more complete understanding of the invention may be had by referring to the drawings in which:

BRIEF DESCRIPTION OF THE DRAWINGS

FIGS. 9–10 are alternate embodiments of the preferred embodiments representing alternative connections of components; and, FIG. 11 is a partial drawing of the positioning of the thermal fuse in respect to a voltage limiter.

DETAILED DESCRIPTION OF THE INVENTION

This design relates to an improved surge protector having dual modes of operation.

The invention will be disclosed in its preferred embodiment of a design to meet UL design Section 37.3 high current abnormal overvoltage test and UL Section 37.4 limited current abnormal overvoltage test.

The design includes first and second overload systems with the addition of a number of components. The preferred design disclosed will disconnect the line conductor under overvoltage conditions occurring line to ground or neutral to ground. This isolates any device connected to the protector outputs from the line input. This preferably includes the more typical impulse voltage (lightning). In contrast with earlier surge protectors, in the present device leakage from the neutral wire to the ground and leakage around the fuse due to other circuit elements is reduced. An important feature of the current invention is to reduce leakage, after damage, to low levels, typically to less than 0.5 ma AC RMS with 120 V applied.

Figure 1:
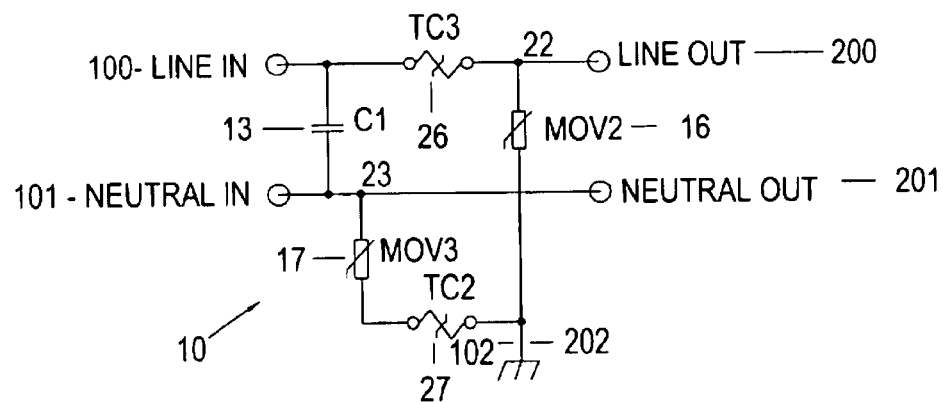
FIG. 1 is a block diagram of a protection device incorporating the invention of the present application.

Referring to FIG. 1, a high current and limited current abnormal overvoltage circuit is disclosed. This circuit is designed to operate on standard alternating current with 120 volts 60 cycle AC disclosed. There are two input connections to the protector (line and neutral) and two outputs (line and neutral) in the disclosed power protection. A ground is utilized in the circuit, preferably a ground common to the input connections and output.

Figures 5, 6:
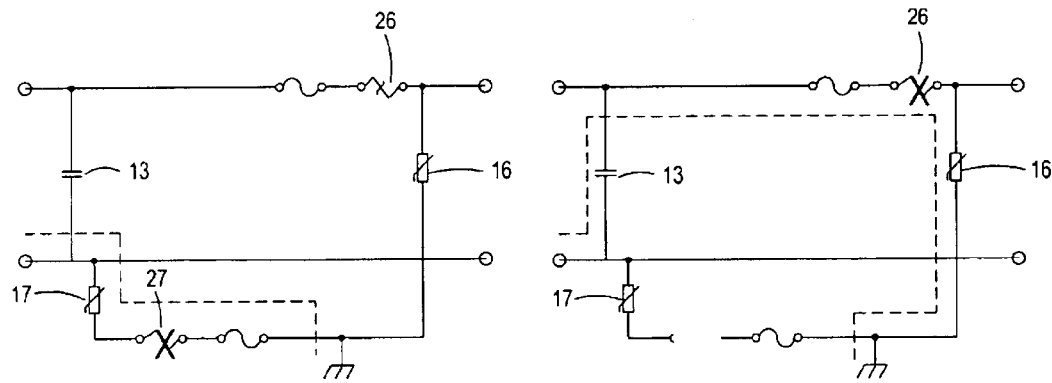
FIG. 5 is a drawing detailing the circuit of FIG. 1 in operation on the first stage of operation for a neutral to ground sustained overvoltage.
FIG. 6 is a drawing detailing the circuit of FIG. 1 in operation on the second stage of operation for a neutral to ground sustained overvoltage.
Figure 7:
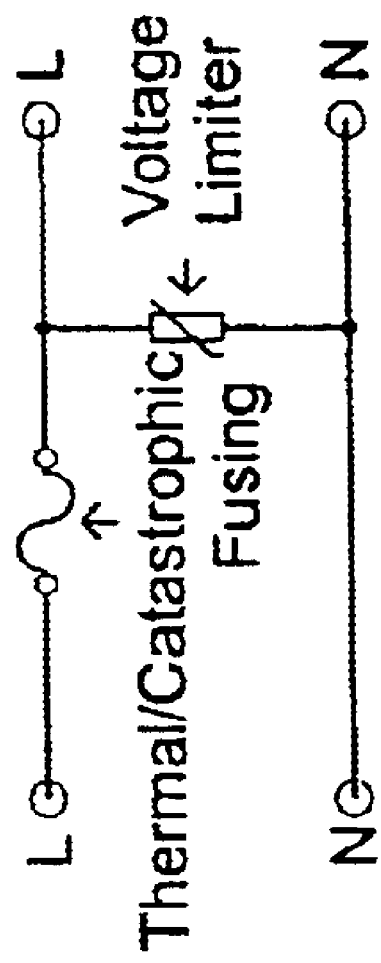
FIG. 7 is a drawing of a prior art surge circuit which disconnects the line on operation.
Figure 8:
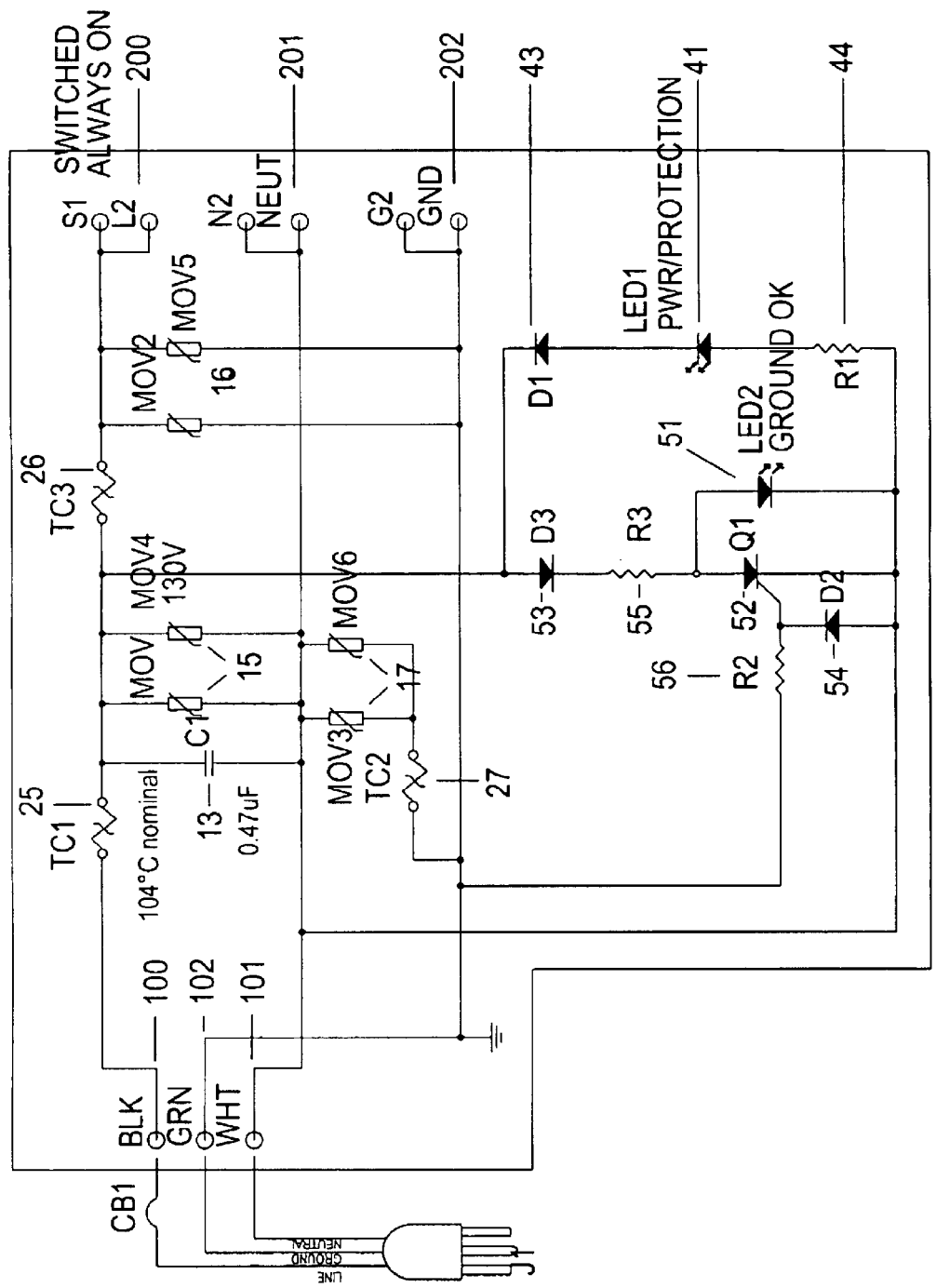
FIG. 8 is a drawing detailing a circuit of a protection device incorporating the invention with an additional indicator circuit.

In this device there are two important protection modes—line to ground overvoltage (FIGS. 3, 4) together with neutral to ground overvoltage (FIGS. 5, 6). These overvoltages situations occur, for example, when 240 volts is, hopefully accidentally, applied to a nominal 120 line or other overvoltage with limited current occurs. High voltage high current protection is also provided as later described.

Note that the neutral to ground protection is important because in a significant percentage of installations line and neutral are reversed (on the order of 10% of the time). While most AC powered equipment will operate under this condition, such unit would not be protected by a typical line to ground surge protector. The present device provides this important additional protection by disconnecting the line under both conditions, and does so with a minimum of components.

A basic circuit 10 to accomplish this protection mode is set forth in FIG. 1. The circuit begins with line in 100 and neutral in 101 inputs and line out 200 and neutral out 201 outputs. An input ground 102 is also provided. (As the protector deals more with the input problems than the output, an output ground is not necessary for the operation of the device.) Preferably the provided ground is common to both input 102 and output 202. A common ground is shown in FIG. 2 and FIGS. 8–10. Interconnected to the ground in the circuit are two voltage limiters (MOV 16 and 17 shown), two thermal fuses (thermal fuses 26 and 27 shown) and a voltage interconnect (capacitor 13 shown).

The voltage limiters protect downstream electric devices from sustained overvoltages (found to be 40–100% above nominal, this latter for example 240 volt on a 120 volt line). They also preferably should include catastrophic AC problems (Catastrophic AC problems such as a "power cross"—a direct accidental short circuit between a high voltage line and a 120 volt AC line—can bring 7,000 volts or more into a building.). The voltage limiters have only a very limited ability to withstand the sustained or catastrophic AC overvoltages before they are overheated and short circuit. Therefore, series fuses (35, 36 shown) are also preferably provided to open the line current path, and disconnect the source voltage before the rest of the voltage limiters melt and cause a fire, or burn out, removing the protective action.

The particular voltage limiters shown are MOV devices 16, 17 in conjunction with thermal fuses. One MOV 16 extends from line to ground from a first node 22 at line out 200 while the other MOV 17 extends from neutral to ground from a second node at neutral in 101. These limiters provide the normal surge protection for the outputs of the protector. These typically are the spikes and impulses present on the inputs. This includes the 6,000 volt, 500 amp 20 microsecond pulses previously described.

The thermal fuses and catastrophic fuses disclosed open to prevent the circuit from developing a greater hazardous state if such circuit is overwhelmed by excessive voltages. The preferred thermal fuses disclosed are activated indirectly due to the excess voltage at the voltage limiters. In the embodiment shown the parameter is heat developed by the overloading of the voltage limiting MOV devices. Since this heat is developed by another component, the proximity of the thermal fuse to this component has an effect on its operation. For example if the thermal fuse were located encapsulated with the MOV (FIG. 11A) it might activate sooner than if located along-side (FIG. 11B). A parallel directly side-by-side placement of the components is preferred for ease of manufacture, speed and consistency of operation.

The particular preferred thermal fuses shown 26, 27 are individually mounted directly on the circuit board in close proximity to the varistors 16, 17, respectively. The configuration in a simplified circuit diagram could utilize two varistors (line to neutral not being provided with a MOV). The actual preferred implementation of the circuit (FIGS. 2 and 8) uses six varistors arranged in three pairs instead of singly and includes a line to neutral MOV. For the preferred implementation of FIGS. 2 and 8 the thermal fuse is mounted on the printed circuit board, between and parallel to the pair of varistors it is associated with. The closer the thermal fuses are to the varistors, the more rapidly they will respond to excess varistor heat, and the less generalized damage and smoke emission will occur. The thermal fuse is a single-operation device, and once it has been activated by excess varistor heat, it must be replaced (normally the varistor would be replaced also) before the protector will be operable. This situation would occur in the preferred embodiment, for example if the protector were subjected to a sustained overvoltage of more than a few cycles of 60 Hz voltage exceeding 170 volts RMS. This limits electrical leakage while also requiring that the protection circuit must be repaired or replaced before the load will be reconnected to incoming power.

For a line to ground overvoltage that continued after thermal fuse 26 opened from the heat from a first MOV 16, the voltage interconnect capacitor 13 would conduct the overvoltage to a second MOV 17 and the adjacent thermal fuse 27. The second varistor would overheat and thermal fuse 27 would open, and complete the disconnection. For a neutral to ground overvoltage that continued after thermal fuse 27 opened from the heat from the second MOV 17, the voltage interconnect capacitor 13 would conduct the overvoltage to the first MOV 16 and the adjacent thermal fuse 26. The first varistor would overheat and thermal fuse 26 would open, and again complete the disconnection. These consecutive actions effectively reduce leakage and continuing abnormal overvoltages. The circuit thus provides similar levels of protection and line cut-off line to neutral as well as neutral to ground.

Figure 2:
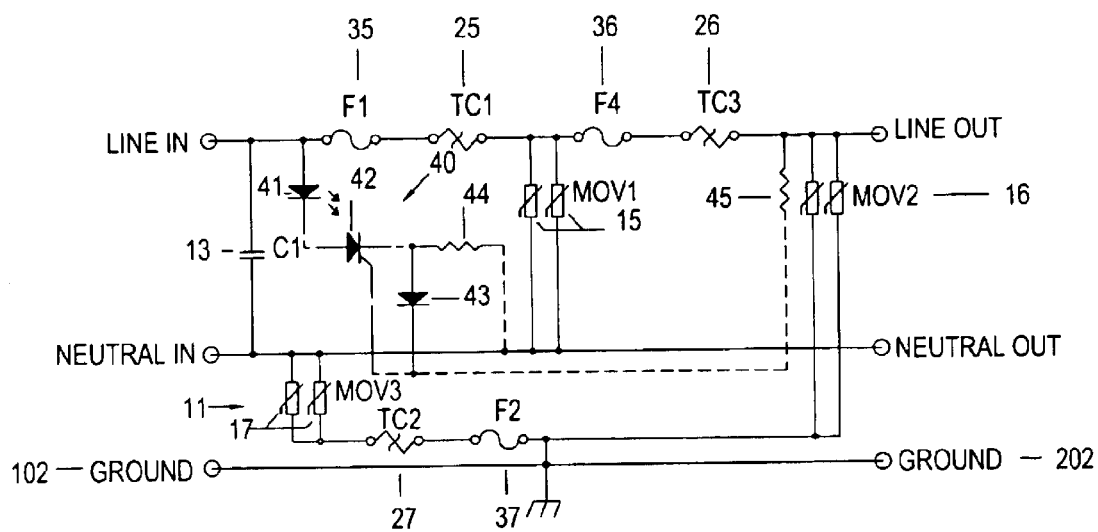
FIG. 2 is a circuit modification of the device of FIG. 1 including additional protection modes and a protection diagnostic indicator circuit.

Note that in the invention the actual connections of the particular components can be varied without affecting overall operation of the invention. For example MOV 17 in FIGS. 1 and 2 is located between neutral in 101 and the thermal fuse 27. These relative positions can be modified without substantive change to the overall operation of the device (the series connection neutral to ground being the main operative parameter-see for example FIGS. 9 and 10).

The interconnect 13 carries the change in voltage in one conductor to alter the condition of a different conductor. In the preferred embodiment disclosed the interconnect passes an operational signal, voltage disclosed, between two inputs under conditions of signal change in the circuit due to the operation of the fuses. This voltage in turn causes further operation of the circuit to reduce output leakage as herein set forth.

The particular interconnect shown is a coupling capacitor 13 between line in 100 and neutral in 101. This capacitor 13 has the advantage of passing voltage between the two lines interconnected thereto. Due to this characteristic, the transmission of the abnormal voltage occurs simply and easily with a minimum of parts.

Other components could fulfill the role of the capacitor. The requirements are that it should not be conducting enough to draw substantial current under normal line to neutral voltage conditions (120 volts AC RMS), but should conduct enough current to be able to heat the varistor and open the thermal fuse under an applied line to ground voltage (200 volts AC RMS or greater).

An example of an alternative component would be a sidactor (an integrated two-terminal zener-SCR structure used as a crowbar-type voltage limiter) with a breakdown voltage of approximately 200 volts peak. (The capacitance of the varistor, 1 nf, would be adequate to convey the line to ground voltage to the sidactor. The Teccor 200–240 volts TO-92 negative break-back device is an example of this sidactor.) A gas tube (spark gap) with a breakdown voltage of >200 volts could also be used in this application.

Another alternative would be to replace 13 with a relay, that would be actuated only by overvoltage, that would connect the varistor upper terminal directly to the line conductor when it was actuated. An active semiconductor network (for example, an SCR connected with a zener diode or a line sensing op amp connected to line and neutral and operating a line and neutral cut off relay depending on the overvoltage condition of either) could also be substituted for capacitor 13.

The capacitor alternative is the preferred embodiment because: 1) there is sometimes already a line to neutral capacitor in many protector circuits to provide RF filtration; 2) capacitors are inexpensive, durable and reliable; and, 3) capacitors are less likely to interfere with the normal operation of the circuit for short impulses than other alternatives above.

Depending on the size of the varistor and the thermal fusing, a minimum capacitor size of 5 nf would be effective in this application, with no effective upper limit except the AC current the capacitor would draw in normal operation.

The preferred basic circuit 10 operates to protect itself as well as the downstream load, in particular under a limited current abnormal sustained overvoltage condition line to ground and neutral to ground (FIGS. 3–6). An example of this abnormal voltage would be a sustained 240 volts on a 120 volt line with a max limiting current of <2 amps.

Figures 3, 4:
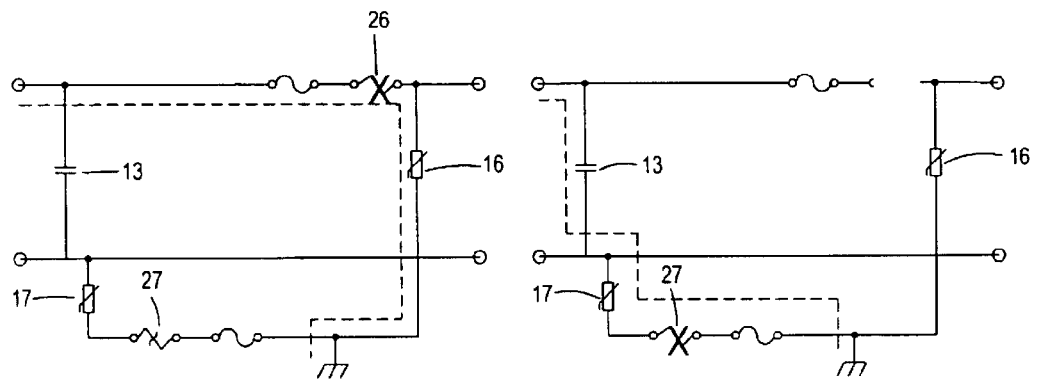
FIG. 3 is a drawing detailing the circuit of FIG. 1 in operation on the first stage of a line to ground sustained overvoltage.
FIG. 4 is a drawing detailing the circuit of FIG. 1 in operation on the second stage of a line to ground overvoltage.

On an abnormal overvoltage line to ground, the voltage limiting MOV 16 would heat causing the thermal fuse 26 to open. This disconnects both MOV 16 and the line out 200 from line in 100 (FIG. 3). At this time in the particular circuit disclosed current would flow through the coupling capacitor 13 and MOV 17 to ground 102. This in turn would heat the MOV 17 causing the thermal fuse 27 to open disconnecting the MOV 17 (FIG. 4).

On an abnormal overvoltage neutral to ground, the voltage limited MOV 17 would heat causing the thermal fuse 27 to open. This disconnects the MOV 17 from ground (FIG. 5). At this time current would flow through the coupling capacitor 13 and MOV 16 to ground. This in turn would heat the MOV 16 causing thermal fuse 16 to open disconnecting MOV 16 and line out 200 from line in 100 (FIG. 6).

The basic circuit 10 of FIG. 1 is preferably utilized with additional components for example in the preferred circuit 11 embodiment of FIGS. 2, 8, 9 and 10 an additional voltage limiter 15 with associated thermal fuse 25 is included (for the addition of line to neutral protection). Also fuses 35, 36 and 37 are provided against catastrophic overvoltages in all modes. (These fuses can be included, and preferably are, traces of known cross-section etched with the rest of the circuit board on which they are included. These fuses, while needing remanufacture or replacement by the circuit board to repair, are preferred because they can be provided inherently in the circuit board.)

In this circuit the MOVs 15, 16 and 17 are 130 vac 20 mm Siemens S20K130E3 MOVs (i.e. 200 volts clamping—their preferred use in parallel substitutes for a larger size while also providing reliability through redundancy), the thermal fuses 25, 26 and 27 are 15 amp, 250 volt and 104° C. activated, and the capacitor 13 is a 0.47 uf 250 volt AC. In the protection to ground indicator circuit leds 41 and 51 are green 2 mm, diodes 43, 53 and 54 are 1N4007, resistors 44 and 55 are 22K ¼ watt and 5%, resistor 56 is 1M ¼ watt and 5% and SCR 52 has a 400 volt 0.8 amp rating. The fuses 35, 36 and 37 are etched circuit board traces with a capacity of 125 vac 15 amp each.

The circuit disclosed operates as follows:

In the event of a line to neutral high current abnormal overvoltage the fuse 35 opens due the high current being drawn by the MOV 15. This has the effect of disconnecting both the MOV 15, MOV 16 and the line out 200 from the line in 100, thereby terminating power.

In the event of a line to ground high current abnormal overvoltage, the fuse 36 opens due to the high current drawn by the MOV 16, disconnecting MOV 16 and the line out 200 from the incoming power. Subsequently, current flows through the capacitor 13 and the MOV 17, heating the thermal fuse 27 and disconnecting this MOV 17 from the ground 102.

In the event of a neutral to ground high current abnormal overvoltage, the fuse 37 opens due to the high current drawn by the MOV 17, disconnecting this MOV 17 from the ground. Subsequently, current flows through capacitor 13 and MOV 16, heating the thermal fuse 26 and disconnecting the MOV 16 and the line output 200 from the line in 100.

In the event of a limited current abnormal overvoltage line to neutral, the thermal fuse 25 opens due to the heating from the MOV 15, disconnecting the MOV 15, MOV 16 and the connected load from the incoming power.

In the event of a limited current abnormal overvoltage line to ground the thermal fuse 26 opens due to heating from the MOV 16, disconnecting the MOV 16 and the connected load from the line in. Subsequently, current flows through the capacitor 13 and the MOV 17, heating the thermal fuse 27 and disconnecting the MOV 17 from the ground.

In the event of a neutral to ground limited current abnormal overvoltage, the thermal fuse 27 opens due to heating from the MOV 17, disconnecting the MOV 17 from the ground. Subsequently, current flows through the capacitor 13 and the MOV 16, heating the thermal fuse 26 and disconnecting the MOV 16 and the connected line out 200 from the line in 100.

Based on the above, it can be seen that any abnormal overvoltages would disconnect the line output of the device from the input with the capacitor aiding in the passage of the necessary current flow. The device interrupts the power to the connected load under conditions of abnormal overvoltage.

If desired, a diagnostic circuit can be included to indicate that the power has been interrupted. In an example circuit 40, any interruption in either of the fuses 35, 36 or thermal fuses 25, 26 would deactivate the gate of the silicon controlled rectifier (SCR) 42 (through resistors 44 and 45). This interruption of the power would cause the green LED 41 to turn off (diode 43 limits the negative voltage across the gate cathode junction).

The above surge protector protects delicate loads from extraneous line voltages. It utilizes MOVs typically included in simpler circuits as sufficient for 6,000 volt 500 amp 20 micro-second pulses in a 120 volt 15 amp circuit, thus protecting against voltage surges occasioned by lightning storms or other transient spikes. The device also protects against open neutral to ground bonds that can result in limited current voltage surge, such as 240 volts to a 120 volt protector. It also protects against utility power-cross events which can apply 10,000 volts to a line circuit, bringing extra voltage into a building. The device also protects the MOVs that can, and typically will, self-destruct during such abnormal inputs. The device thus protects against leaving the load connected to it with no protection. Further in up to 10% of all household sockets have line and neutral are reversed, a condition which is in need of the same protection neutral to ground as in line to neutral: the present device does so. Also the surge protectors also will normally either survive or die safely under these severe events. Modifications can also be made without deviating from the invention as hereinafter claimed. For example in the embodiments disclosed the thermal fuse 27 is located in three locations (contrast FIGS. 1, 9 and 10). The other thermal fuses 25, 26 could similarly be moved without deviating from the invention as thereafter claimed. This along with the positioning of components in FIG. 11 demonstrates the adaptability of the claimed invention. For additional example in FIG. 9 a device is disclosed that fuses and operably disconnects the neutral conductor under sustained overvoltage conditions. While this embodiment may not be commercially viable in the U.S. due to present existent voluntary UL standards, the design does have technical value (if only in foreign markets) and is viable in the U.S. should standards change. Differing number of protected lines are also amenable to the circuit, for example a three line, three phase 408 input, by altering the circuit accordingly. Other modifications are also possible.

What is claimed is:

1. An apparatus for providing abnormal overvoltage protection between inputs and outputs, both including line and neutral, the apparatus comprising a ground, a first voltage limiter extending between the line and the ground, said first voltage limiter developing heat upon the existence of abnormal voltage between the line and the ground, a first thermal fuse, said first thermal fuse extending between the line input and the line output, said first thermal fuse opening in response to said heat developed by said first voltage limiter, a second voltage limiter extending between neutral and the ground, a second thermal fuse, said second thermal fuse extending between the neutral and the ground, said second thermal fuse opening in response to said heat developed by said second voltage limiter, a voltage interconnect, said voltage interconnect passing voltage between the line and neutral inputs under conditions of the opening of said first or second thermal fuses.

2. The apparatus of claim 1 characterized in that said voltage interconnect is a capacitor.

3. The apparatus of claim 1 characterized in that said second thermal fuse extends between said second voltage limiter and the ground.

4. The apparatus of claim 1 characterized in that said second thermal fuse extends between the neutral input and said second voltage limiter.

5. The apparatus of claim 1 characterized in that said second thermal fuse also extends between the neutral input and the neutral output.

6. The apparatus of claim 5 characterized in that said second voltage limiter extends between the neutral output and the ground.

7. The apparatus of claim 1 characterized in that the ground is common to the input and the output.

8. The apparatus of claim 1 characterized in that the first voltage limiter is connected to the line output.

9. The apparatus of claim 1 characterized in that the second voltage limiter is connected to the neutral input.

10. The apparatus of claim 1 characterized in that said voltage interconnect is a sidactor.

11. The apparatus of claim 1 characterized in that said voltage interconnect is a gas tube.

12. An apparatus for providing abnormal overvoltage protection between inputs and outputs, both including line and neutral, the apparatus comprising a ground, a first voltage limiter extending between the line and the ground at a first node, said first voltage limiter developing heat upon the existence of abnormal voltage between the line and the ground at said first node, a first thermal fuse, said first thermal fuse extending between said first node and the line input, said first thermal fuse opening in response to said heat developed by said first voltage limiter, a second voltage limiter extending between neutral and the ground, a second thermal fuse, said second thermal fuse extending in series with said second voltage limiter between the neutral and the ground, said second thermal fuse opening in response to said heat developed by said second voltage limiter, a voltage interconnect, and said voltage interconnect passing voltage between the line input and ground input under conditions of the opening of said first or second thermal fuses.

13. The apparatus of claim 12 characterized in that said voltage interconnect is a capacitor.

14. The apparatus of claim 12 characterized in that said second thermal fuse extends between said second voltage limiter and the ground.

15. The apparatus of claim 12 characterized in that said second thermal fuse extends between the neutral input and said second voltage limiter.

16. The apparatus of claim 12 characterized in that said second thermal fuse also extends between the neutral input and the neutral output.

17. The apparatus of claim 16 characterized in that said second voltage limiter extends between the neutral output and the ground.

18. The apparatus of claim 12 characterized in that the ground is common to the input and the output.

19. The apparatus of claim 12 characterized in that the first voltage limiter is connected to the line output.

20. The apparatus of claim 10 characterized in that the second voltage limiter is connected to the neutral input.

21. The apparatus of claim 12 characterized in that said voltage interconnect is a sidactor.

22. The apparatus of claim 12 characterized in that said voltage interconnect is a gas tube.

23. An apparatus for providing abnormal overvoltage protection between inputs and outputs, both including line and neutral, the apparatus comprising the input having a ground, a first voltage limiter extending between the line output and the input ground at a first node, said first voltage limiter developing heat upon the existence of abnormal voltage between the line output and the input ground at said first node, a first thermal fuse, said first thermal fuse extending between said first node and the line input and being substantially parallel to said first voltage limiter, said first thermal fuse providing heat upon the application of a line overvoltage, said first thermal fuse opening in response to said heat developed by said first voltage limiter, a second voltage limiter extending between neutral input and the ground at a second node, a second thermal fuse, said second thermal fuse extending in series with said second voltage limiter between the neutral input and the ground, said second thermal fuse opening in response to said heat developed by said second voltage limiter, a voltage capacitor, said voltage capacitor interconnect passing voltage between the line input and ground input under conditions of the opening of either of said first or second thermal fuses to heat the other of said first or second voltage limiters and open the other of said first or second thermal fuses respectively.

24. An improvement for a voltage surge protector having a thermal fuse extending between line input and line output, a reference input, such thermal fuse opening based on the condition of a voltage limiter extending between line and the reference input, the improvement comprising a ground, a neutral input and output, the reference input being said ground, a second thermal fuse opening based on the condition of said second voltage limiter extending between said neutral and said ground, an interconnect capacitor, and said interconnect capacitor extending between line and neutral.

25. The improvement of claim 24 characterized in that the thermal fuse is located between the voltage limiter and the line input.

26. The improvement of claim 24 characterized in that the thermal fuse is located between the voltage limiter and the line output.

27. The improvement of claim 24 characterized in that said second voltage limiter connects to said neutral input.

28. The improvement of claim 27 characterized in that said second thermal fuse is located between said second voltage limiter and the neutral output.

29. The improvement of claim 27 characterized in that said second thermal fuse extends in series with said second voltage limiter neutral to ground.

30. A method for providing abnormal overvoltage protection between inputs and outputs including both line and neutral, the method sensing the existence of an abnormal voltage on one of line or neutral, opening a first fuse on said one of line or neutral in response to said sensing of said abnormal voltage, and opening a second fuse on the other of said one of line or neutral by selectively passing voltage between the line and ground inputs under conditions of the opening of said first or second fuses.

31. An improved method for operating a voltage surge protector having a thermal fuse extending between line input and line output, the method including opening such thermal fuse based on the condition of a voltage limiter extending between line and a reference ground and opening a second thermal fuse extending between neutral and said ground, with one of the opening of said first or said second thermal fuse utilizing an interconnect capacitor extending between line and neutral.

* * * * *